United States Patent

Tanii et al.

[11] Patent Number: 5,307,101
[45] Date of Patent: Apr. 26, 1994

[54] CAMERA USING FILM CARTRIDGE

[75] Inventors: Junichi Tanii, Izumi; Masaaki Chikasaki, Toyonaka; Nobuya Miki, Nara; Akira Yamanaka; Ikushi Nakamura, both of Sakai; Masayoshi Horikawa, Toyokawa, all of Japan

[73] Assignee: Minolta Camera Kabushiki Kaisha, Osaka, Japan

[21] Appl. No.: 684,267

[22] Filed: Apr. 12, 1991

[30] Foreign Application Priority Data

Apr. 16, 1990 [JP] Japan .................................. 2-99973
Apr. 18, 1990 [JP] Japan ................................. 2-102030
Jul. 6, 1990 [JP] Japan ................................. 2-179789

[51] Int. Cl.$^5$ ............................................. G03B 1/18
[52] U.S. Cl. ................................. 354/173.1; 354/212
[58] Field of Search ................. 354/173.1, 173.11, 212, 354/214

[56] References Cited

U.S. PATENT DOCUMENTS 4,095,249 6/1978 Miura ................................ 354/288
4,841,319 6/1989 Hansen ............................. 354/275
4,870,437 9/1989 Omaki et al. ....................... 354/64

FOREIGN PATENT DOCUMENTS 2-151844 6/1990 Japan .

Primary Examiner—David M. Gray
Attorney, Agent, or Firm—Burns, Doane, Swecker & Mathis

[57] ABSTRACT

A camera using a film cartridge having a shaft for winding a film and intercepting light, includes: a cartridge chamber for accommodating the film cartridge; a driving unit; a driving source for generating force for driving the driving unit; a transmitting device; and a limiting device. The driving member engages the shaft of the film cartridge accommodated in the cartridge chamber, and rotates the shaft in the film unwinding direction to remove the film from the film cartridge. The transmitting device is provided between the driving source and the driving unit, and transmits the force generated by the driving source to the driving unit. The limiting device is provided in the transmitting device, and limits the force to be transmitted to the driving unit so as to feed the film in the film unwinding direction.

5 Claims, 5 Drawing Sheets

CAMERA USING FILM CARTRIDGE

BACKGROUND OF THE INVENTION

The present invention relates to a camera and more particularly, to the camera using a film cartridge in which a film, wound by a winding shaft provided in the film cartridge, can be contained with intercepting light coming from outside of the film cartridge.

Film cartridges of various constructions for use in a camera are proposed. One of them proposes that the winding shaft of the film cartridge is rotated in the film unwinding direction so as to take out the film from the passing slit of the film cartridge.

According to such film cartridge, the film cannot be fed out from the cartridge if the leading end of the film is caught by something in the film cartridge or contacts dust or the like. If the rotation of the winding shaft continues in the film unwinding direction, the film cannot be fed out through the film passing slit of the cartridge. As a result, the film loosens in the cartridge, but is incapable of loosening beyond a certain extent. As a result, a portion of the film positioned in the vicinity of the winding shaft is bent, and turned over or cut, which may damage the film.

A method for stopping the rotation of the winding shaft by detecting the abnormality of the film can be considered, but it is difficult to specify the abnormal portion of the film in the cartridge. Although a method for weakening force for feeding the film may be considered, it is also difficult to maintain the driving force at a constant magnitude and in addition, it is necessary to regulate the inertia force of the winding shaft.

Additionally, it is necessary to provide the camera body with an ejecting mechanism for removing the cartridge from its cartridge chamber. The cartridge may be taken out from the cartridge chamber by pressing a button, but it is convenient to provide the camera body with a mechanism for interlocking the cartridge removing operation with the operation for opening the cover of the cartridge chamber.

According to the interlocking mechanism, with the opening operation of the cover, the cartridge is pressed upward from the cartridge chamber. Therefore, it is difficult to insert the cartridge into the cartridge chamber when the cover has been opened. Even though the cartridge is inserted into the cartridge chamber while the cover is pivoting to close the opening of the cartridge, the base portion of the cover contacts the corner of the upper portion of the cartridge, thus preventing the cover from moving downward.

SUMMARY OF THE INVENTION

Accordingly, an essential object of the present invention is to provide a camera using a film cartridge capable of effectively preventing a film from being damaged when the winding shaft of the film cartridge is rotated in the film unwinding direction.

Another important object of the present invention is to provide a camera using a film cartridge which can be smoothly inserted into a cartridge chamber.

In accomplishing these and other objects, according to one aspect of the present invention, there is provided a camera using a film cartridge in which a film, wound by a winding shaft provided in the film cartridge, can be contained with intercepting light coming from outside of the film cartridge, comprising:

a cartridge chamber for accommodating the film cartridge;

a driving means, engaging the shaft of the film cartridge accommodated in the cartridge chamber, for rotating the shaft in a film unwinding direction to remove the film from the film cartridge;

a driving source means for generating force for driving the driving means;

transmitting means, provided between the driving source means and the driving means, for transmitting the force generated by the driving source means to the driving means; and limiting means, provided in the transmitting means, for limiting the force to be transmitted to the driving means so as to feed the film in the film unwinding direction.

In the above construction, the limiting means may adjust the driving force to be applied to the driving means so that the maximum force for feeding the film in the film winding direction is greater than the maximum force for feeding the film in the film unwinding direction.

According to the above construction, if the driving force for feeding the film in the film unwinding direction exceeds the predetermined magnitude in transmitting the driving force from the driving source means to the driving means via the transmitting means, the limiting means regulates the transmission of the driving force to reduce the driving force to less than the predetermined magnitude. As such, if the film is caught by something in the cartridge chamber, the driving force is not transmitted to the winding shaft of the cartridge chamber. Therefore, the film is not damaged.

According to another aspect of the present invention, there is provided a camera using a film cartridge in which a film, wound by a winding shaft provided in the film cartridge, can be contained with intercepting light coming from outside of the film cartridge, comprising:

a cartridge chamber, having an opening for inserting the film cartridge thereinto and removing the film cartridge therefrom, for accommodating the film cartridge inserted thereinto;

a cover member movable to open and close the opening;

a cartridge driving means for moving the film cartridge, accommodated in the cartridge chamber, between a predetermined first region and a second region positioned downward from the first region; and interlocking means for interlocking motion of the cover member and operation of the cartridge driving means so that the cartridge driving means positions the film cartridge in the first region when the cover member is located between an opened position and an intermediate position which the cover member reaches after moving a certain amount from the opened position toward a closed position and in the second region when the cover member is located between the intermediate position and the closed position.

According to the above construction, from the cover-opened position of the cover member to the intermediate position thereof, the cartridge driving means positions the cartridge in the first region in contact therewith, and during the motion of the cover member from the intermediate position to the cover-closed position, the cartridge driving means pivots in contact with the cartridge. Thus, the cartridge is positioned in the second region. That is, when the cover member closes the opening with the cartridge inserted into the cartridge chamber, the cartridge is positioned in the second region. Therefore, the pivotal motion of the cover member is not prevented.

BRIEF DESCRIPTION OF THE DRAWINGS

These and other objects and features of the present invention will become apparent from the following description taken in conjunction with the preferred embodiments thereof with reference to the accompanying drawings, in which.

DESCRIPTION OF THE EMBODIMENTS

Figure 1:
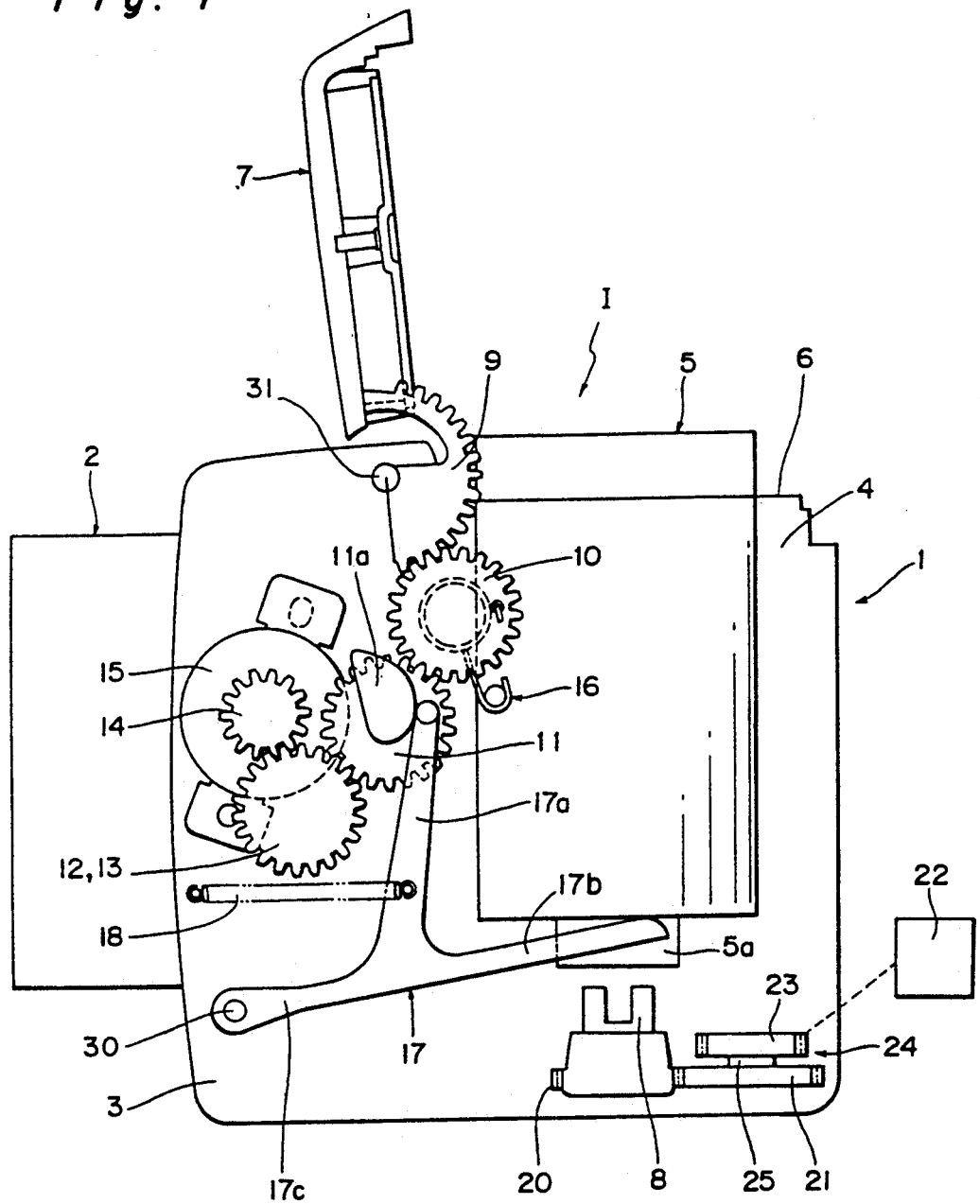
FIG. 1 through FIG. 3 are perspective views showing the body of a camera comprising a film cartridge, according to an embodiment of the present invention, in which the cover of the main body has been opened, pivoted a certain angle, and closed, respectively.

Before the description of the present invention proceeds, it is to be noted that like parts are designated by like reference numerals throughout the accompanying drawings.

Referring to FIGS. 1 through 6, a camera comprising a film cartridge according to an embodiment of the present invention is described below.

Figure 2:
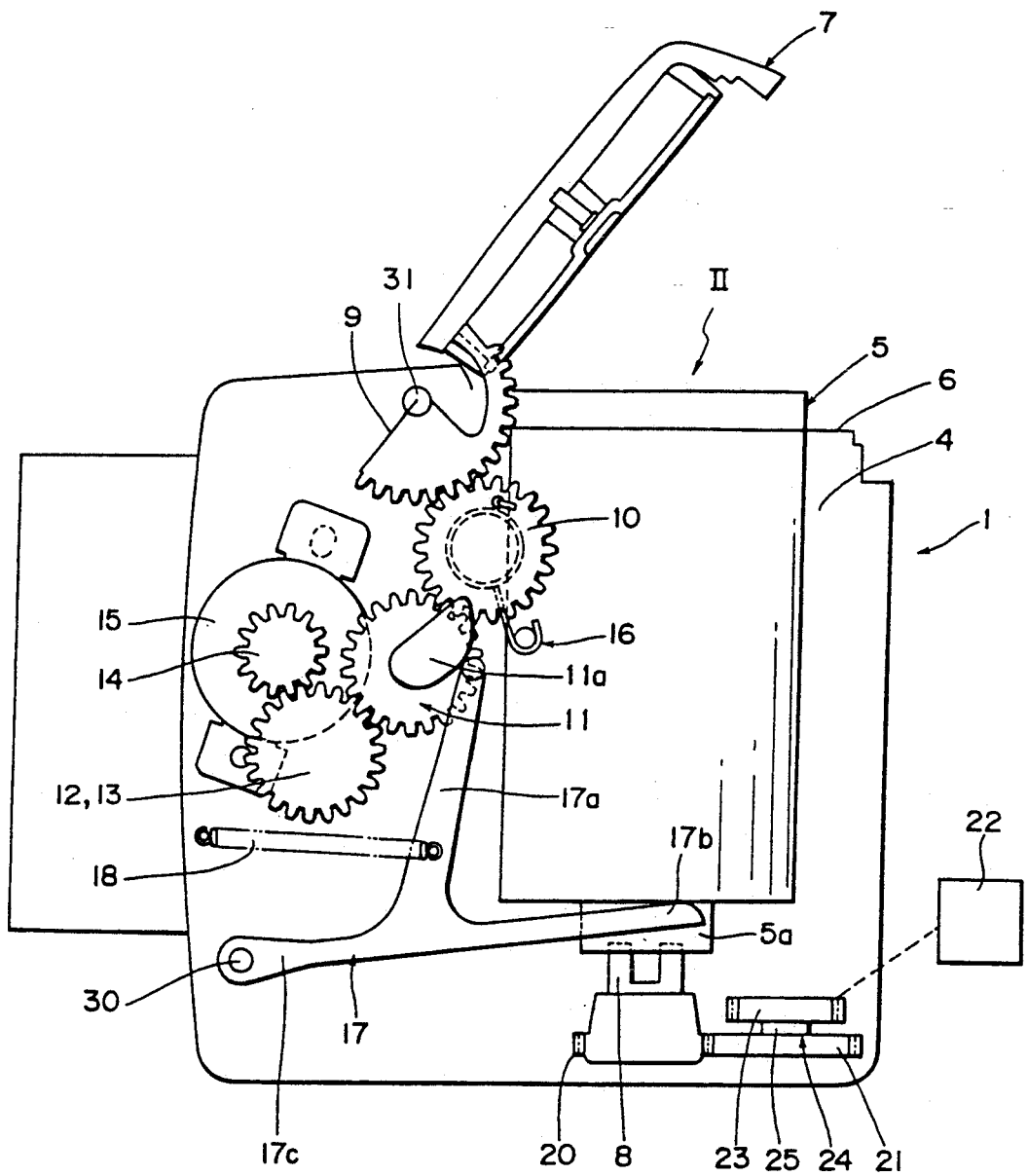
Figure 3:
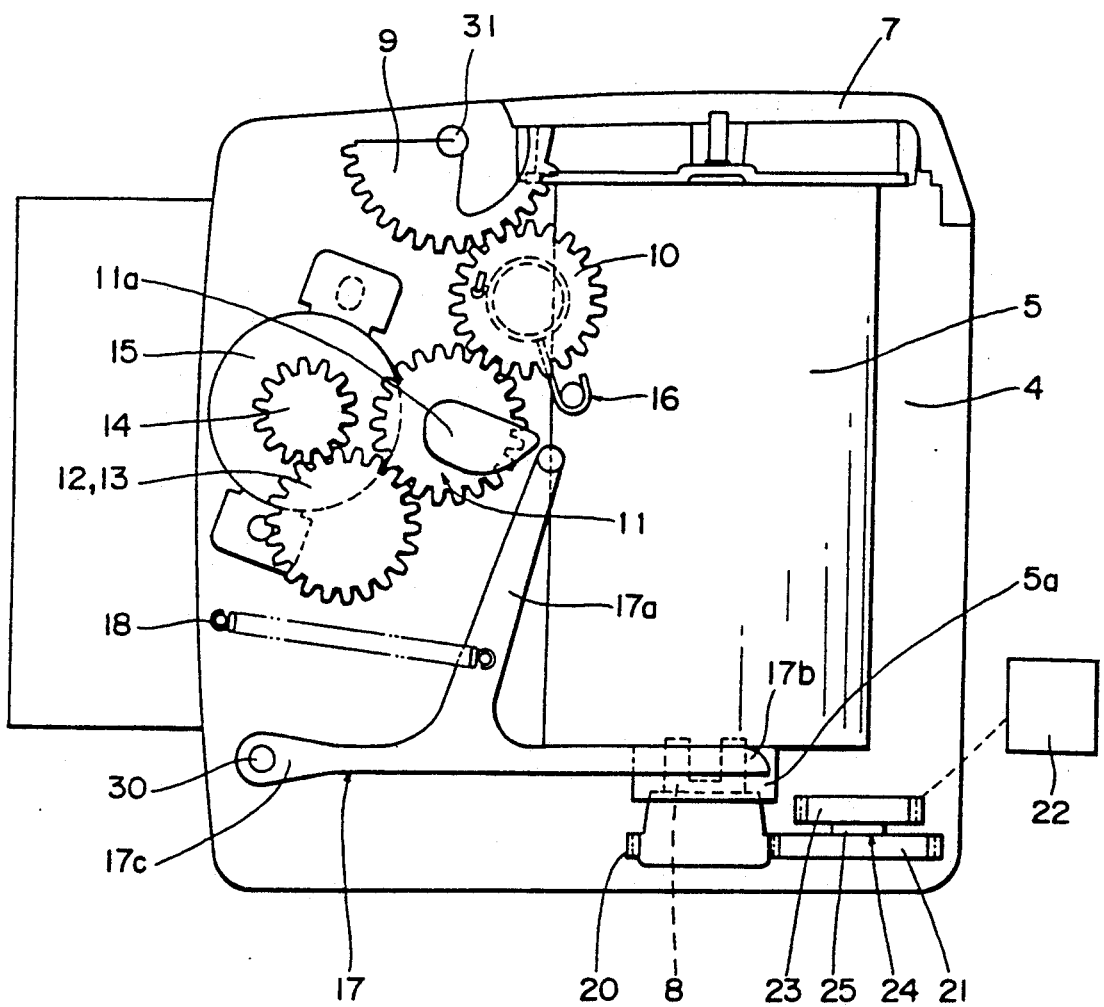

FIGS. 1 through 3 show the interior of the camera 1 according to the embodiment. FIG. 1 shows a cover 7, of a film cartridge chamber 4, which has been opened. FIG. 2 shows the cover 7 which is pivoted a certain angle to an intermediate position from its opened position shown in FIG. 1. FIG. 3 shows the cover 7 which has been closed. The camera 1 comprises a photographing lens 2 provided on the front face of a camera body 3 and the cartridge chamber 4 provided in the camera body 3. An opening 6 for inserting the cartridge 5 into the cartridge chamber 4 and removing it therefrom is formed on the upper portion of the cartridge chamber 4. The cover 7 for opening and closing the opening 6 is pivotally mounted on the upper portion of the camera body 3. A fork 8 capable of engaging a film winding shaft 5a of the cartridge 5 so as to rotate the winding shaft 5a is provided below the cartridge chamber 4 of the camera body 3. A gear 9 is mounted on the base portion of the cover 7 such that the gear 9 and the cover 7 are integrally connected with each other about a shaft 31 mounted on the camera body 3.

Figure 4:
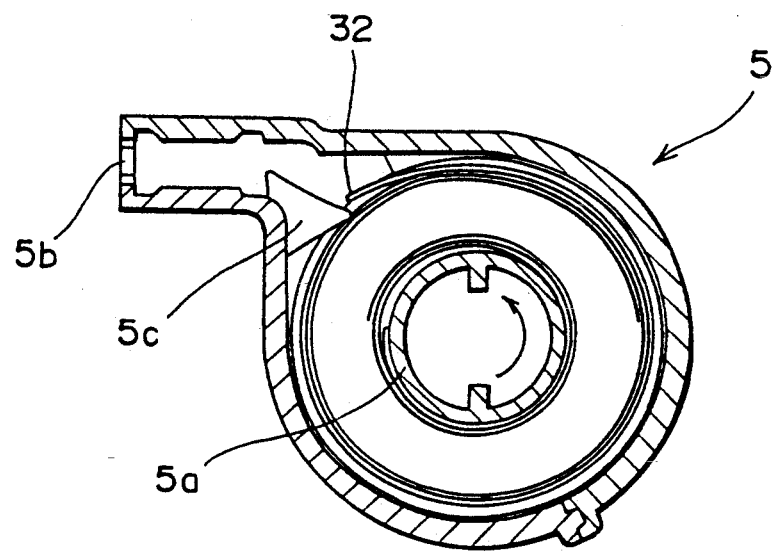
FIG. 4 is a cross sectional view showing the film cartridge.

As shown in FIG. 4, the film cartridge 5 intercepts light and accommodates a film 32 wound around the shaft 5a. When the shaft 5a rotates in the direction shown by the arrow, the film 32 is loosened and fed out from a film passing slit 5b while being guided by a guiding member 5a.

The camera body 3 contains gears 10, 11, 12, 13, and 14. The gear 9 integrally mounted on the base portion of the cover 7 engages the gear 10. The gear 11 engages the gears 10 and 12. The gear 13 engages the gear 14. The gears 12 and 13 are connected with each other such that they can be disconnected from each other as will be described later. The gear 14 is connected with a damper device 15. Accordingly, the gear 9 is connected with the damper device 15 via the gears 10, 11, 12, 13, and 14.

Since one end of a spring 16 is fixed to the gear 10 engaging the gear 9 and the other end thereof is fixed to the camera body 3, the gear 10 is urged in a clockwise direction by the spring 16. Therefore, the gear 9 is urged in a counterclockwise direction, namely, in the direction in which the cover 7 is opened.

The gear 11 in mesh with the gear 10 is integrally connected with a cam 11a which operates in association with the rotation of the gear 11.

A T-shaped ejecting lever 17 comprising arms 17a, 17b, and a base portion 17c is rotatably supported by a shaft 30 fixed to the camera body 3. The ejecting lever 17 is urged in a counterclockwise direction about the shaft 30 by a spring 18 provided between the arm 17a and the camera body 3. Therefore, the columnar end portion of the arm 17a is in contact with the side face of the cam 11a provided on the gear 11 by the spring 18 and the arm 17b contacts the lower surface of the cartridge 5 accommodated in the cartridge chamber 4.

Figure 5:
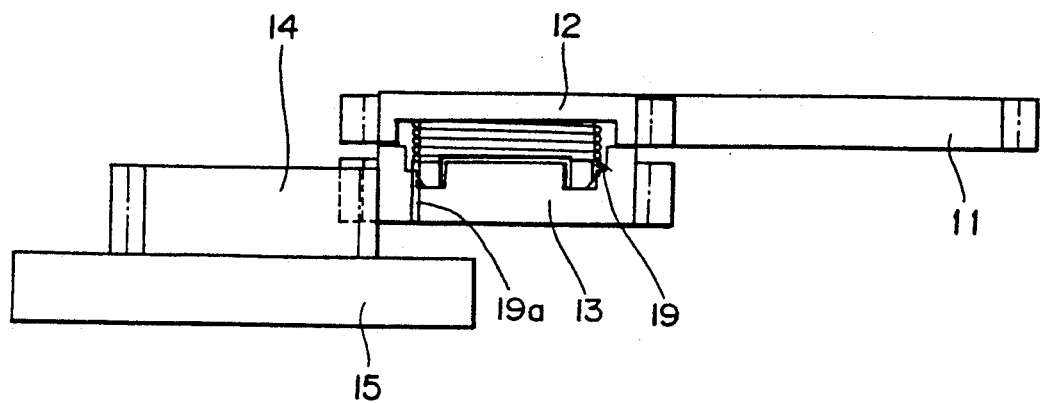
FIG. 5 is an enlarged side elevation showing members in the vicinity of a damper device.

As shown in FIG. 5, the gear 12 coaxial with the gear 13 is provided in the camera body 3. One end of a spring 19 positioned between the gears 12 and 13 is fixed to the gear 12 and an arm 19a, namely, the other end thereof is removably connected with the gear 13. Only when the gear 12 rotates in a clockwise direction in FIGS. 1 to 3 with respect to the gear 13, the gears 12 and 13 are operatively connected with each other. When the gear 12 rotates in a counterclockwise direction, the gears 12 and 13 are disconnected from each other.

The gear 14 engaging the gear 13 is connected with the damper device 15 on the movable side thereof viscously connected with the fixed side thereof, namely, connected with the fixed side thereof through viscous fluid so that the operation of the gear 14 is always delayed.

Figure 6:
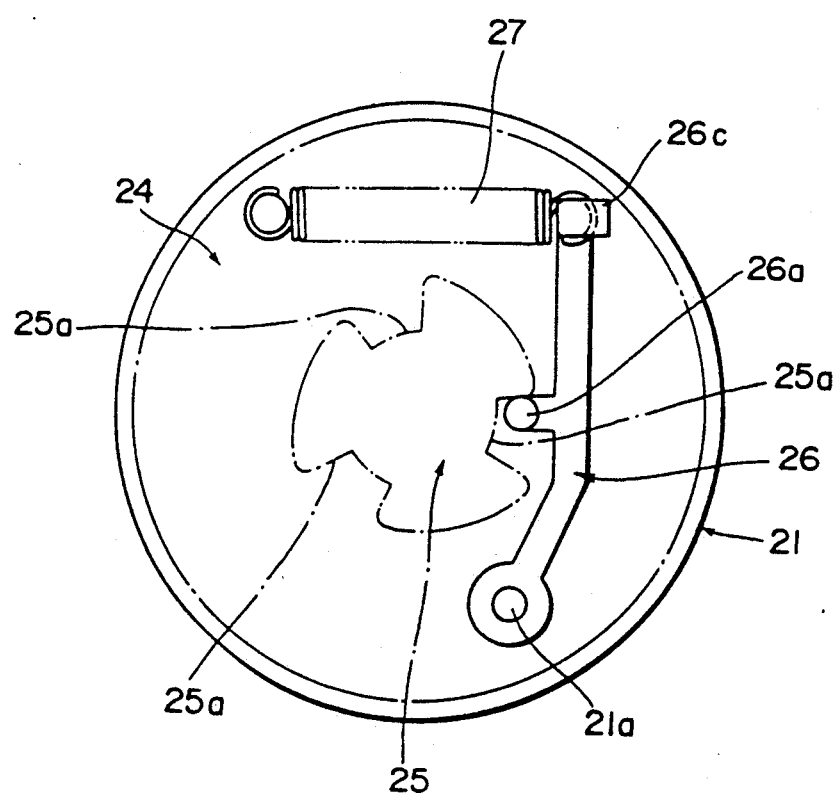
FIG. 6 is a plan view showing a torque limiter.

A gear 20 is provided on the lower portion of the driving fork 8 positioned below the cartridge chamber 4. The gear 20 engages a gear 21 serving as a member for transmitting the force generated by a film driving device 22, comprising a motor, to the winding shaft 5a. The gear 21 and a gear 23, connected with the film driving device 22 and therefore serving also as a member for transmitting the force of the film driving device 22 to the winding shaft 5a, are connected with each other via a torque limiter 24. As shown in FIG. 6, the torque limiter 24 comprises a cam 25 integrally formed on the gear 23 and having three concaves 25a serving as cam portions, a lever 26 supported by the gear 21, and a spring 27, one end of which is fixed to the gear 21. The base portion of the lever 26 is supported by a shaft 21a formed on the gear 21 and the top portion 26c thereof is connected to the other end of the spring 27. Therefore, the lever 26 is urged to rotate in a counterclockwise direction about the shaft 21a by the spring 27. That is, the spring 27 urges a columnar projection 26a of the lever 26 toward the cam 25, thus causing the projection 26a to be fitted into one of the concaves 25a of the cam 25. Each concave 25a has two radial edge faces. One of the radial edge faces of each concave 25a which contacts the projection 26a when the gear 21 rotates in the counterclockwise direction (film unwinding direction) is set to be longer than the other radial edge face of the concave 25a which contacts the projection 26a when the gear 21 rotates in the clockwise direction (film winding direction). Thus, it is more difficult for the projection 26a to disengage from the concave 25a when the gear 21 rotates in the film unwinding direction than when it rotates in the film winding direction. Further, the maximum driving force to be transmitted to the winding shaft 5a so as to feed the film 32 in the film winding direction is set to be greater than the maximum driving force to be transmitted to the winding shaft 5a so as to feed the film 32 in the film unwinding direction. Normally, the projection 26a engages one of the concaves 25a of the cam 25, thus connecting the gears 23 and 21 with each other. When an overload is applied between the gears 23 and 21, the projection 26a of the lever 26 is pressed out of the concave 25a. As a result, the gears 23 and 21 are disconnected from each other.

The operation of the camera of the above construction is described below.

As shown in FIG. 1, when the cartridge 5 is inserted downward into the cartridge chamber 4 along the winding shaft 5a from the opening 6 in opening the cover 7, the lower surface of the cartridge chamber 4 is pressed upward by the arm 17b of the ejecting lever 17. As a result, the upper portion of the cartridge 5 projects from the opening 6. This position of the cartridge 5 is referred to as a first region (I). Upon start of the pivotal motion of the cover 7 from the opened position as shown in FIG. 1 to the intermediate position as shown in FIG. 2, the gear 9 rotates in the clockwise direction as a result of the pivotal motion of the cover 7. As a result, the gear 10 engaging the gear 9 rotates in the counterclockwise direction against the urging force of the spring 16. Therefore, the gear 11 rotates in the clockwise direction. The cam 11a provided on the gear 11 presses the arm 17a of the ejecting lever 17 in the clockwise direction about the shaft 30 against the urging force of the spring 18. With the downward movement of the arm 17b, the cartridge 5 moves downward from the first region (I) to a second region (II) as shown in FIG. 2. The cartridge 5 is in the second region (II) before the cover 7 is positioned as shown in FIG. 2. When the cover 7 is pivoting from the opened position to the intermediate position, the gear 12 rotates in the counterclockwise direction with respect to the gear 13 and the spring 19 disconnects the gears 12 and 13 from each other. Therefore, the rotational force of the gear 12 is not transmitted to the damper device 15. Therefore, the damper device 15 does not prevent the cover 7 from being closed.

While the cover 7 is being pivoted from the intermediate position as shown in FIG. 2 to the closed position as shown in FIG. 3, the cover 7 is brought in contact with the cartridge 5 which is moving downward, thus pressing the upper surface of the cartridge 5 downward. As a result, the arm 17b of the ejecting lever 17 is pressed by the lower surface of the cartridge 5, thereby rotating in the clockwise direction about the shaft 30 against the urging force of the spring 18. Consequently, the arm 17a moves away from the cam 11a. A locking mechanism not shown locks the cover 7 in its closed position shown in FIG. 3, so that the cover 7 keeps closing the opening 6. In this condition, the winding shaft 5a of the cartridge 5 is rotated in the film unwinding direction. Consequently, the film 32 is fed out from the film passing slit 5b of the cartridge 5, so that it is possible to perform a photographing operation. After the whole frames of film have been exposed, the film 32 is rewound around the winding shaft 5a.

When the cover 7 is unlocked from the locking mechanism, the urging force of the spring 16 causes the gear 10 to rotate in the clockwise direction, so that the gear 9 rotates in the counterclockwise direction. As a result, the cover 7 pivots in the counterclockwise direction to open the opening. At this time, the gear 12 rotates in the clockwise direction with respect to the gear 13, so that the spring 19 operatively connects the gears 12 and 13 with each other, which operates the damper device 15. Therefore, the cover 7 pivots in the counterclockwise direction with a comparatively slow speed. In this condition, the cartridge 5 is not pressed by the cover 7. The urging force of the spring 18 causes the lever 17 to rotate in the counterclockwise direction about the shaft 30 at a relatively slow speed such that the arm 17a follows the cam 11a in contact therewith. Therefore, the cartridge 5 is pressed upward by the arm 17b, with the result that the cartridge 5 is positioned in the first region (I) as shown in FIG. 1. In this condition, the cartridge 5 can be removed from the cartridge chamber 4.

According to the embodiment, from the cover-opened position as shown in FIG. 1 to the intermediate position as shown in FIG. 2, the ejecting lever 17 positions the cartridge 5 in the first region (I) in contact therewith. During the pivotal motion of the cover 7 from the intermediate position to the cover-closed position as shown in FIG. 3, the ejecting lever 17 pivots in the clockwise direction in contact with the cartridge 5 according to the operation of the gears 9, 10, 11, and the cam 11a while the ejecting lever 17 contacts the cartridge 5. Thus, the cartridge 5 is positioned in the second region (II). That is, when the cover 7 closes the opening 6 with the cartridge 5 inserted into the cartridge chamber 4, the cartridge 5 is positioned in the second region (II) which is lower than the region (I) in the cartridge chamber 4. Therefore, the pivotal motion of the cover 7 is not prevented and thus the cover 7 may smoothly close the opening 6.

The operation of the torque limiter 24 is described below with using FIG. 6. Normally, the projection 26a of the lever 26 engages one of the concaves 25a of the cam 25. Thus, the torque limiter 24 operatively connects the gears 23 and 21 with each other. If the film 32 cannot be fed out from the cartridge chamber 4, i.e., if anything gets caught by the film 32 in spite of the operation for rotating the winding shaft 5a in the film unwinding direction and thereby an overload is applied between the gears 23 and 21, the projection 26a is pressed out from the concave 25a and the gears 23 and 21 are disconnected from each other. Accordingly, the driving force of the film driving device 22 is always transmitted to the fork 8 in a magnitude less than a predetermined magnitude. When the driving force of the film driving device 22 exceeds the predetermined magnitude because dust or the like gets caught by the film 32, the force of the film driving device 22 is not transmitted to the film 32. Therefore, an excessive force is not applied to the film 32. As such, the film 32 can be prevented from being damaged.

In addition to the above embodiment, the present invention may be carried out in various modes. For example, the torque limiter 24 and the damper device 15 may be embodied using known constructions. The radial edge faces of the concave 25a of the cam 25 may be inclined in a different degree. That is, one of the radial edge faces of the concave 25a which contacts the projection 26a when the gear 21 rotates in the film unwinding direction (counterclockwise direction) makes a large angle so that it is easy for the projection 26a to disengage from the concave 25a when the gear 21 rotates in the film unwinding direction. The other radial edge face of the concave 25a which contacts the projection 26a when the gear 21 rotates in the film winding direction makes no angle or a small angle with the radius so that it is difficult for the projection 26a to disengage from the concave 25a when the gear 21 rotates in the film winding direction. Thus, the maximum force to be transmitted to the winding shaft 5a so as to feed the film 32 in the film unwinding direction may be set to be small while the maximum force to be transmitted to the winding shaft 5a so as to feed the film 32 in the film winding direction may be set to be great. The configuration of the radial edge faces of the concave 25a may be varied as follows: One of the radial edge faces of the concave 25a which contacts the projection 26a when the gear 21 rotates in the film unwinding direction forms a large angle, so that it is easy for the projection 26a to disengage from the concave 25a when the gear 21 rotates in the film unwinding direction. The other radial edge face of the concave 25a which contacts the projection 26a when the gear 21 rotates in the film winding direction makes no angle, or a small angle with the radius, or is projected radially in a great extent so that it is difficult for the projection 26a to disengage from the concave 25a when the gear 21 rotates in the film winding direction. In this case, the torque limiter 24 is constructed so that it operates only when the winding shaft 5a is rotated in the film unwinding direction. Further, a motor serving as the driving source may be stopped upon detection of the actuation of the torque limiter. In addition, it is possible, after the motor is stopped, to rotate the film in the film winding direction and then in the film unwinding direction.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A device using a film cartridge in which a film, wound by a winding shaft provided in the film cartridge, can be contained intercepting light coming from outside of the film cartridge, comprising:
    a cartridge chamber for accommodating the film cartridge;
    a driving means, engaging the shaft of the film cartridge accommodated in the cartridge chamber, for rotating the shaft in a film unwinding direction to remove the film from the film cartridge;
    a driving source means for generating force for driving the driving means;
    transmitting means, provided between the driving source means and the driving means, for transmitting the force generated by the driving source means to the driving means; and
    disengaging means, provided in the transmitting means, for disengaging the force to be transmitted to the driving means for feeding the film in the film unwinding direction when a load applied to said driving means exceeds a predetermined magnitude.

2. A device using a film cartridge in which a film, wound by a winding shaft provided in the film cartridge, can be contained intercepting light coming from outside of the film cartridge, comprising:
    a cartridge chamber for accommodating the film cartridge;
    a driving means, engaging the shaft of the film cartridge accommodated in the cartridge chamber, for rotating the shaft in a film unwinding direction to feed out the film from the film cartridge;
    a driving source means for generating force for directing the driving means;
    transmitting means, provided between the driving source means and the driving means, for transmitting the force generated by the driving source means to the driving means; and
    limiting means, provided in the transmitting means, for limiting the force to be transmitted to the driving means for feeding the film in the film unwinding direction when a load applied to said driving means exceeds a predetermined magnitude, wherein the driving means rotates in a film winding direction as well by the force generated by the driving source means; and the limiting means adjusts the driving force to be applied to the driving means so that the maximum force for feeding the film in the film winding direction is greater than the maximum force for feeding the film in the film unwinding direction.

3. The device as claimed in claim 1, wherein the disengaging means comprises a torque limiter for disengaging the force generated by the driving source means to be transmitted to the driving means.

4. The device as claimed in claim 1, wherein the film cartridge has a film passing slit for feeding the film thereinto and feeding out the film therefrom; and the driving means rotates the shaft in the film unwinding direction so as to remove the film through the film passing slit of the film cartridge.

5. A device as claimed in claim 1, wherein the device is a camera.

* * * * *